United States Patent [19]

Schumacher et al.

[11] 4,191,798

[45] Mar. 4, 1980

[54] HIGHLY FILLED THERMOPLASTIC COMPOSITIONS BASED ON ETHYLENE INTERPOLYMERS AND PROCESSING OILS

[75] Inventors: Frederick G. Schumacher, Wilmington, Del.; Walter Yllo, Carneys Point, N.J.

[73] Assignee: E. I. Du Pont de Nemours and Company, Wilmington, Del.

[21] Appl. No.: 963,111

[22] Filed: Nov. 22, 1978

[51] Int. Cl.$^2$ .............................................. B32B 27/30
[52] U.S. Cl. ............................ 428/95; 260/33.6 UA; 260/33.6 PQ; 260/42.43; 260/42.52; 428/96
[58] Field of Search ............... 260/33.6 PQ, 33.6 UA, 260/42.52, 42.43; 428/522, 523, 95, 96

[56] References Cited

U.S. PATENT DOCUMENTS

| | | | |
|---|---|---|---|
| 3,010,899 | 11/1961 | Boyer | 260/33.6 UA |
| 3,203,921 | 8/1965 | Rosenfelder | 260/33.6 UA |
| 3,390,035 | 6/1968 | Sands | 428/95 |
| 3,817,893 | 6/1974 | Gladding | 260/33.6 UA |
| 3,904,456 | 9/1975 | Schwartz | 260/42.11 |

*Primary Examiner*—Lewis T. Jacobs

[57] ABSTRACT

Highly filled thermoplastic compositions useful as sound-deadening sheeting for automotive carpet are obtained by blending about 5–50% by weight of an ethylene interpolymer, such as ethylene/vinyl ester, ethylene/unsaturated mono- or dicarboxylic acids or esters of said unsaturated acids, etc.; about 2–15% by weight of processing oil; and about 50–90% by weight of filler.

20 Claims, No Drawings

HIGHLY FILLED THERMOPLASTIC COMPOSITIONS BASED ON ETHYLENE INTERPOLYMERS AND PROCESSING OILS

BACKGROUND OF THE INVENTION

1. Field of the Invention

This invention relates to highly filled blends and more specifically, it relates to highly filled blends of ethylene interpolymers modified with processing oil.

2. Description of the Prior Art

The use of processing oils with natural rubber or synthetic rubber-like compounds containing sulfur, accelerators, carbon black and other additives customarily used in the rubber industry is well known. In some instances in order to obtain very high tensile strength values, fillers are omitted. On the other hand, it is known that styrene/butadiene rubber (SBR) compounds, such as are used to adhere jute secondary backings to carpets, can readily hold up to 80% by weight or more of calcium carbonate filler. Vulcanization or curing enhances blend strength.

For thermoplastic elastomeric uses it is desirable both to avoid curing and to employ fillers to reduce blend costs, as well as to increase blend density.

Binary blends of ethylene/vinyl acetate (EVA) copolymer with filler are known as articles of commerce. The practical limit for addition of a filler such as the more commonly employed medium density fillers, e.g. $CaCO_3$, bauxite, gypsum, etc., is about 60% by weight, even when using a relatively low melt index (higher molecular weight) resin, or softer, higher vinyl acetate grades. As filler levels rise, other properties suffer, such as melt index (as it drops, extruder pressures mount rapidly), softness (the "hand" becomes much stiffer), and elongation (which drops alarmingly). Ultimately, at about the 70% filler level, it is not possible to compound binary EVA/Whiting (naturally occurring ground limestone, $CaCO_3$, from Georgia Marble Company) blends as the mixture will no longer "flux" in a Banbury Mixer (the charge merely stirs--the resin will not "work" as the blades turn, no power rise ensues, the mixture on discharge is still discrete EVA pellets in a powdery Whiting mass). If one were to use a very dense filler, such as $BaSO_4$, approximately 10% by weight more filler can be added to binary EVA blends.

Industrial noise and its control are items of increasing concern to governmental, environmental, and industrial organizations. Governmental agencies are establishing noise limits to which workers may be exposed to protect their health.

From an aesthetic standpoint, noise also presents problems. Advertisements for "quiet riding" automobiles are ubiquitous. Manufacturers are attempting to make other vehicles quiet as well--including campers, trailers, buses, trucks, and off-road-use farm vehicles.

It has long been known that interposing mass between a sound source and the area to be kept quiet is an effective means for attaining sound deadening. A stone wall is extremely effective--but is not often practical. A sheet of lead is thin, flexible, often highly effective, but costly. The challenge, then, is to attain a dense, thin, flexible sheet which can be interposed between a source of noise and the area to be quietened.

Sheets of thermoplastics or of rubberlike materials have long been used as sound-deadening means. To make the sheets flexible, dense, strong, and inexpensive has posed a challenge to compounders for many years. For some uses, such as automobile carpet underlayment, the sound-deadening sheet must also be moldable.

Schwartz U.S. Pat. No. 3,904,456 is related to a method for inhibiting transmission of airborne noise by interposing in the air space between the noise source and the location to be insulated a thin, dense normally self-supporting film or sheet composed essentially of from about 10 to about 40% by weight of ethylene/vinyl acetate copolymer having an average vinyl acetate content of from about 10 to about 42% by weight and a glass transition temperature of at least about 30° C. below the average ambient temperature in the air space, and from about 60 to about 90% by weight of inorganic filler materials, such as sulfates, carbonates, oxides, etc. of barium, calcium, cadmium, etc., effective to produce an overall density greater than at least 2 grams per cubic centimeter.

EVA copolymers have been used industrially for nearly two decades, however, they are not known to be used in conjunction with processing oils as articles of commerce. This could well be an outgrowth of the way EVA commercialization has proceeded. That is, most EVA blends are based on EVA/paraffin wax technology, where paraffin wax weight is often up to ten times the weight of the EVA present. Furthermore, despite the obvious savings inherent in using lower-cost, lower-quality waxes, such as scale wax or slack wax, all attempts to do this have failed. The reason was always the same--the oil content of the wax migrated and destroyed the effectiveness of the coatings or adhesive when the oil reached the bond or sheet surface. Thus, compounders "knew" that oil could not be used in EVA blends and technology developed along other lines.

Rundle U.S. Pat. No. 3,497,375 discloses coating compositions for wooden concrete molds consisting of ethylene/vinyl acetate copolymer and paraffinic oil. There is no filler employed in the coating compositions of this patent.

Monaghan U.S. Pat. No. 3,379,193 discloses teeth covers made of ethylene-vinyl acetate copolymer in itself or in combination with mineral oil and, if desired, with fibers and coloring materials. The preferred formulation is disclosed to be 47% by weight of ethylene-vinyl acetate copolymer, 47% by weight of mineral oil, 5% by weight of nylon fibers, and 1% by weight of titanium dioxide.

German Patent Application No. 2,319,431 discloses sound deadening composites suitable for use in automobiles which consist of a highly filled polymer sheet (for example, 300-1200 or even up to 1500 parts of filler per 100 parts of polymer) which on its backside is provided with a filler material sheet, e.g., a polymer foam. Suitable polymers for use are disclosed to be terpolymers of ethylene, propylene and non-conjugated diene (EPDM), polyvinyl chloride (PVC), mixed polymers of ethylene and vinyl acetate (EVA), styrene-butadiene mixed polymers (SBR) and mixtures of these materials with thermoplastic polymers, such as polystyrene and polyolefins.

Boyer U.S. Pat. No. 3,010,899 discloses blends of ethylene/vinyl acetate resin and mineral oil which are either rubbery or grease like depending upon the proportion of oil to resin and can be used as a substitute for crepe rubber or as a grease. It is further disclosed that fillers such as carbon black or finely divided clays can be added to the rubbery products to increase hardness and produce materials suitable as floor tile. As indicated for example in Claim 11, the filler, carbon black, is present in a "minor amount" while the oil-ethylene/vinyl acetate copolymer mixture is present in a "major amount". In Example 2 an oil+resin/carbon black ratio of 4 parts by weight to 1 part by weight is indicated.

Rosenfelder U.S. Pat. No. 3,203,921 discloses the use of compositions consisting essentially of 73–88% by weight of a homo- or copolymer of ethylene (which can be ethylene/vinyl acetate or ethylene/ethyl acrylate copolymer), 2–7% by weight of an aliphatic paraffinic hydrocarbon mineral oil and 10–20% by weight of a mineral filler, (for example, calcium carbonate, barium sulfate, etc.) for preparing blow-molded objects such as dolls.

SUMMARY OF THE INVENTION

According to the present invention there is provided a composition consisting essentially of (a) from about 5 to about 50% by weight of at least one copolymer of ethylene with at least one comonomer selected from the group consisting of vinyl esters of saturated carboxylic acids wherein the acid moiety has up to 4 carbon atoms, unsaturated mono- or dicarboxylic acids of 3 to 5 carbon atoms, the ethylene content of said copolymer being from about 60 to about 90% by weight, the comonomer content of said copolymer being from about 10 to about 40% by weight, and the melt index of said copolymer being from about 0.1 to about 150, provided that when said copolymer of ethylene is an ethylene/vinyl ester copolymer said copolymer can contain up to about 15% by weight of carbon monoxide; (b) from about 2 to about 15% by weight of processing oil; and (c) from about 50 to about 90% by weight of filler.

Further provided according to the present invention are the above compositions in the form of a sound deadening sheet.

Still further provided according to the present invention are carpets and especially automotive carpets having a backside coating consisting essentially of the above compositions.

As used herein the term "consisting essentially of" means that the named ingredients are essential, however, other ingredients which do not prevent the advantages of the present invention from being realized can also be included.

DETAILED DESCRIPTION OF THE INVENTION

It has been found that inclusion of a processing oil in highly loaded blends of ethylene/vinyl acetate and filler allows the preparation of considerably higher filler level containing blends than can be attained in corresponding binary blends of EVA-filler. Further more these component blends can be prepared employing high oil content, even in the absence of rubbers, elastomers, carbon black, or other oil absorbing materials. If desired, EVA-based, non-bleeding blends containing very high filler levels can be prepared employing certain processing oils according to the present invention.

The ethylene copolymers suitable for the composition of the present invention are copolymers with at least one comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms. Terpolymers of ethylene and the above comonomers are also suitable. In addition terpolymers of ethylene/vinyl acetate/carbon monoxide containing up to about 15 percent by weight of carbon monoxide can also be employed.

The ethylene content of the copolymer is from about 60 to about 90% by weight and the comonomer content is from about 10 to about 40% by weight. The preferred ethylene and comonomer level is from about 65 to about 85% and from about 15 to about 35% by weight, respectively. A mixture of two or more ethylene copolymers can be used in the blends of the present invention in place of a single copolymer as long as the average values for the comonomer content will be within the above indicated range.

Employing a copolymer containing over 28% nonethylenic comononer (such as vinyl acetate) results in blends that are less stiff and have lower tensile strength, while their elongation is increased. The most preferred level is about 18 to 28 weight percent. Below 18% vinyl acetate, the blends become such stiffer, lose elongation, and oil compatability problems arise. Even blends made with nonbleeding oils become "oily" as polyethylene homopolymer is approached.

Melt index of the copolymer can range from about 0.1 to about 150, preferably from about 0.1 to about 50.

Physical properties, principally elongation, decline to lower levels when the ethylene copolymer melt index is above about 30. Lower melt index ranges, about 1 to 10, are most preferred to maintain strength.

Generally from about 5 to about 50% by weight of ethylene copolymer is employed in the composition of the present invention, preferably from about 5 to about 30% by weight, and most preferably from about 10 to about 25% by weight.

In accordance with the above, suitable ethylene copolymers are such as ethylene/vinyl acetate, ethylene/acrylic acid, ethylene/methacrylic acid, ethylene/ethyl acrylate, ethylene/isobutyl acrylate, ethylene/methyl methacrylate, and ethylene/vinyl acetate/carbon monoxide. Particularly suitable copolymers are ethylene/vinyl acetate, and ethylene/ethyl acrylate copolymers.

The oil ingredient of the composition of the present invention is known as processing oil. Three types of processing oils are known-paraffinic, aromatic and naphthenic. None of these are pure, the grades identify the major oil type present.

Paraffinic oils tend to "bleed" from blends. Bleeding is normally not desirable, but could be useful in specialty applications, for example, in concrete forms where mold release characteristics are valued.

On the other hand, naphthenic and aromatic oils are non-bleeding when used in proper ratios and are thus preferable for uses such as automotive carpet backsize.

Processing oils are also subdivided by viscosity range. "Thin" oils can be as low as 100–500 SUS (Saybolt Universal Seconds) at 100° F. (38° C.). "Heavy" oils can be as high as 6000 SUS at 100° F. (38° C.). Processing oils, especially naphthenic and aromatic oils with viscosity of from about 100 to 6000 SUS at 100° F. (38° C.) are preferred.

The amount of oil present in the composition of the present invention is from about 2 to about 15% by weight, preferably from about 4 to about 12% by weight. Most preferably when using a filler of medium density, such as calcium carbonate, the amount of processing oil is from about 5 to about 10% by weight, and when using a filler of higher density, such as barium sulfate, the amount of processing oil is from about 4 to about 10% by weight.

Addition of processing oil in an amount of less than about 2% will not have a significant effect. Processing oil in the amount of in excess of about 10% will cause the melt index to rise rapidly and the blend to become much softer. At extremes, for example, at 70% filler, over 15% oil and less than 15% EVA, the oil content overwhelms the blend as the amount of EVA present is not adequate to provide "guts" for the blend.

Table I shows the effect of the type of oil selected upon an important property of the final blend; i.e., does oil exude from the blend or does it stay bound firmly within the compound? Table II shows how the oil exudation ratings were arrived at. Table III summarizes the composition, properties and origin of various processing oils. In the Table I comparison five aromatic oils were evaluated. All of them stayed firmly bound within the compound, even after two weeks of standing. Further, all six paraffinic oils tested showed a marked tendency to exude within a week under ambient conditions. The test specimens all showed a tendency to exude, all within a week, and, in some cases, on standing overnight.

The naphthenic oils generally showed no tendency to exude--although in a few cases some exudation was noted. Properties of oils depend upon two factors--the process and conditions used during refining and the source of the crude oil used. As examples, "Tufflo" 2000 (P) and "Tufflo" 2000 (H) are rated by the manufacturer as closely equivalent products. Nevertheless, the (P=Philadelphia) version did not bleed, but blends based on the (H=Houston) product showed a slight tendency to exude oil. Thus, the purchaser of an oil must evaluate it with care--and must work closely with the refiner to ensure constancy of quality. This is particularly true because industrially obtained processing oils are not "pure" in that they nearly always contain more than one type of oil. For example, an "aromatic" oil contains predominantly aromatic ring structures but also usually contains substantial proportions of naphthenic rings. Similarly, some naphthenic oils contain paraffinic oil as well. Relative proportional shifts among the oil types will, of course, change blend performance.

This is not to say that bleeding of oil, per se, is inherently good or bad. For most uses, bleeding is not acceptable and must be avoided. However, in other cases, e.g., a release coating or film intended for application to a concrete mold or form, a migration of traces of oil could prove desirable in avoiding adhesion of the curing concrete to the form.

The comments above apply to smooth pressed sheets, made with a high surface sheen, as would be produced in industry by a conventional combination of an extruder plus a set of polished finishing rolls. The detection of exudation tendency or degree is much more difficult, if not impossible, to observe when sheets with rough surfaces are used.

TABLE I

Exudation Rating As A Function Of Type And Source Of Oil

| Ingredients: | EVA #3*/EVA#4* (50/50) | 16% by wt. |
| --- | --- | --- |
| | Oil to be tested | 9% by wt. |
| | Filler - No. 9 Whiting* | 75% by wt. |
| Storage Condition: | Two weeks at 72° F., 50% R.H. | |

| | Oil | Exudation Rating |
| --- | --- | --- |
| Aromatic: | "Sundex" 790 & 8600T | None |
| | "Flexon" 340 & 391 | None |
| | "Tufflo" 491 | None |
| Naphthenic: | "Circosol" 450, 4240 & 5600 | None |
| | "Sunthane" 450 & 4240 | None |
| | "Flexon" 676; "Flexon" 766 | None; heavy, respectively |
| | "Tufflo" 500 and 2000 (P) | None |
| | "Tufflo" 2000 (H) and 6024 | Slight |
| | "Tufflo" 6204 | Heavy |
| Paraffinic: | "Sunpar" 150 & 2280 | Heavy |
| | "Flexon" 815 & 865 | Heavy |
| | "Tufflo" 60 & 80 | Heavy |

*defined in Table IV

TABLE II

Oil Exudation Rating For Compositions

| Rating | Visual | Tactile | Absorption On Paper |
| --- | --- | --- | --- |
| None | No visible change | Feels dry | No transfer to paper |
| Very Slight | No visible change | Dry | Smallest perceptible oil traces on paper |
| Slight | No visible change | Borderline | Oil transfer to paper is easily noticed. |
| Moderate | Surface gloss changes noted--may look "wet" | Slippery feel but no visible transfer to fingers | Paper beneath sample is definitely wet--under entire sample area. |
| Heavy | Wet film readily noticed--oil droplets may be visible | Heavy film exists--which streaks when rubbed. Finger feels oily after test. | Paper is thoroughly wetted. Oil wicks well beyond the area in contact with the test strip. |

TABLE III

CLASSIFICATION AND CHARACTERISTICS OF PROCESSING OILS

| TRADE NAME | TYPE[1] | ASTM TYPE | SP.GR | VISCOSITY SUS[2] 100° F. | 210° F. | CARBON ATOMS % $C_A$ | $C_N$ | $C_P$ | MOL. WT.[3] |
| --- | --- | --- | --- | --- | --- | --- | --- | --- | --- |
| "CIRCOSOL" 4240 | N | 103 | 0.95 | 2525 | 87 | 21 | 39 | 40 | 395 |
| "CIRCOSOL" 5600 | N | 103 | 0.95 | 5945 | 135 | 20 | 38 | 42 | 450 |
| "CIRCOSOL" 450 | N | 103 | 0.94 | 515 | 52 | 21 | 37 | 42 | 355 |
| "SUNPAR" 150 | P | 104 B | 0.88 | 500 | 64 | 4 | 27 | 69 | 530 |
| "SUNPAR" 2280 | P | 104 B | 0.89 | 2907 | 155 | 4 | 25 | 71 | 720 |

TABLE III-continued
CLASSIFICATION AND CHARACTERISTICS OF PROCESSING OILS

| TRADE NAME | TYPE[1] | ASTM TYPE | SP.GR | VISCOSITY SUS[2] 100° F. | VISCOSITY SUS[2] 210° F. | CARBON ATOMS % $C_A$ | CARBON ATOMS % $C_N$ | CARBON ATOMS % $C_P$ | MOL. WT.[3] |
|---|---|---|---|---|---|---|---|---|---|
| "SUNDEX" 790 | A | 102 | 0.98 | 3500 | 85.7 | 37 | 28 | 35 | 375 |
| "SUNDEX" 8600T | A | 101 | 0.98 | — | 300 | 30 | 22 | 48 | — |
| "SUNTHANE" 450 | N | 103 | 0.93 | 502 | 52 | 15 | 43 | 42 | 355 |
| "SUNTHANE" 4240 | N | 103 | 0.88 | 2206 | 85 | 18 | 41 | 41 | 400 |
| "FLEXON" 340 | A | 102 | 0.95 | 130 | 38.7 | 31 | 41 | 28 | |
| "FLEXON" 766 | N | 104 A | 0.90 | 503 | 58.2 | 1 | 45 | 54 | |
| "FLEXON" 865 | P | 104 B | 0.87 | 332 | 43–61 | 4 | 27 | 69 | |
| "FLEXON" 815 | P | 104 B | 0.90 | 2650 | 155 | 2 | 32 | 66 | |
| "FLEXON" 676 | N | 103 | 0.93 | 1200 | 72 | 15 | 40 | 45 | |
| "FLEXON" 391 | A | 102 | 0.98 | 4010 | 92 | 28 | 43 | 29 | |
| "TUFFLO" 60 | P | — | 0.88 | 600 | 68 | 4 | 26 | 70 | 550 |
| "TUFFLO" 80 | P | | 0.90 | 2640 | 155 | 4 | 23 | 73 | 720 |
| "TUFFLO" 500[4] | N | | 0.94 | 518 | 52 | 22 | 36 | 42 | 355 |
| "TUFFLO" 2000[4] | N | | 0.95 | 2150 | 82 | 20 | 39 | 41 | 390 |
| "TUFFLO" 491[5] | A | | 0.99 | 7060 | 128 | 40 | 20 | 40 | 425 |
| "TUFFLO" 2000[5] | N | | 0.93 | 2110 | 97 | 12 | 38 | 50 | 460 |
| "TUFFLO" 6024[5] | N | | 0.89 | 175 | 43 | 1 | 50 | 49 | 345 |
| "TUFFLO" 6204 | N | | 0.91 | 1750 | 91 | 2 | 49 | 49 | |

[1] A = aromatic; N = naphthenic P = paraffinic. As classified by supplier
[2] SUS = Saybolt Univeral Seconds ≃ 5 × Viscosity in centipoise (cp)
[3] as provided by supplier
[4] from Philadelphia
[5] from Houston
Source of Circosol, Sunpar, Sundex, Sunthane oils was Sun Oil
Source of Flexon oils was Exxon
Source of Tufflo oils was Arco The third essential ingredient of the composition of the present invention is the filler. The percentage of filler that can be included in the composition of the present invention on a weight basis is primarily a function of the density of the filler. Particle size of the filler has a minor effect. Fine particle size fillers generally have a tendency to result in higher blend viscosities and they are also more expensive. #9 Whiting which has been used extensively in the present compositions (about 95% through 325 mesh) represents a viable midpoint in coarseness, availability and cost. Most preferred fillers are calcium carbonate, and barium sulfate. The amount of filler present in the composition of the present invention is from about 50 to about 90% by weight, preferably from about 60 to about 85% by weight. Most preferably, when using a filler of medium density, such as calcium carbonate, the amount of filler is from about 65 to about 80% by weight, and when using a filler of higher density, such as barium sulfate, the amount of filler is from about 70 to about 85% by weight.

When the ethylene interpolymer employed in the composition of the present invention is an ethylene/vinyl ester copolymer, such as ethylene/vinyl acetate, and when the filler employed in combination therewith is clay, such as "SUPREX" Clay, it is necessary to add oil to the blend in order to passivate the clay. Proper sequencing of the addition of the ingredients is necessary to attain success in the mixing operation. Sequence A below, during intensive mixing will be successful; while sequence B may fail, if the EVA/clay mixture is heated before the clay is passivated because of the decomposition of the EVA copolymer caused by the clay. Decomposition is accompanied by liberation of anhydrous acetic acid, and discoloration of the blend.

Sequence A: "X" - Clay - "Y" - Oil - Mix - EVA - Mix.

Sequence B: "X" - Clay - EVA -Mix - Oil -"Y" - Mix.

In the above illustration, "X" and "Y" may be either nothing or other fillers, diluents or resins that do not influence the otherwise probable adverse reaction of the EVA with untreated clay. The above passivation of clay, in order to enable use of substantial amounts of clay in ethylene/vinyl ester blends is the subject matter of simultaneously filed patent application Ser. No. 963,112.

Polymers, both homo- and copolymers, other than the ones referred to above, can also be used to some extent in combination with the above specified polymers without significantly interfering with the advantages obtained by the present invention. Similarly other ingredients can also be added to the compositions of the present invention by a compounder in order to obtain some desired effect, such as reduction of cost, or enhancement of physical property. Accordingly, extender resins, waxes, foaming agents, antioxidants etc. that are widely used, particularly in hot melts, can be included in the compositions of the present invention.

A commercially sized batch-type Banbury or equivalent intensive mixer is entirely suitable for preparing the compositions of the present invention. A Farrel continuous mixer ("FCM") is also an excellent mixing device. In either instance, dry ingredients are charged in routine fashion. It is convenient in most cases to inject the oil component directly into the mixing chamber of either unit as per widely used practice with this type of equipment. A mix cycle of about 3 minutes is generally adequate for the Banbury mixer at an operating temperature usually between 325° and 375° F. The operating rate for the FCM unit generally will fall within ranges predicted by literature prepared by the Farrel Company, Ansonia, Conn. Again, temperatures between 325° and 375° F. are effective. In both cases, a very low oil level, say about 2-3%, may require higher temperatures, while oil levels above about 7% may mix well at lower mixer temperatures. While not evaluated, it is expected that other devices for compounding of viscous mixes (MI of 0.1 to 20) should be entirely satisfactory—but in any case, prototype trials in advance are desirable.

Once blends are mixed, routine commercial practices may be used, such as underwater melt cutting plus drying or use of sheeting plus chopping methods, to produce a final pelletized product.

Primary use for the compositions of the present invention will probably be in the sheeting field, particularly for low cost, dense, sound deadening structures. Outstanding characteristics such as improved "hand", "drape", reduced stiffness, and reduced thickness of the extruded sheeting result from the compositions of the present invention.

The blends of the present invention can readily be extruded onto a substrate, such as an automotive carpet, or can be extruded or calendered as unsupported film or sheet. Depending upon the equipment used, and the compounding techniques employed, it is possible to extrude wide ranges of film thickness, from below 20 mils to above 75 mils. While not demonstrated, a film thickness of even less than 10 mils and over 100 mils could probably be readily attained. This then provides industry with an opportunity to vary the amount of sound deadening to be attained by varying film thickness, density of blends, ratio of filler load to binder, and similar techniques well known in the art.

The sound-deadening sheet produced may be used in various ways:

When applied to automotive carpet, blends described are an effective and economic means to deaden sound, while also simultaneously serving as a moldable support for the carpet.

When used in sheet form, the blends can be installed in other areas of an automobile, truck, bus, etc., such as side panels, door panels, roofing areas, etc.

In sheet form, blends may be used as drapes or hangings to shield or to surround a noisy piece of factory equipment such as a loom, a forging press, etc.

In laminated sheet form, blends, faced with another material, might be used to achieve both a decorative and a functional use—such as dividing panels in an open-format office.

In the application of the compositions of the present invention in carpets, the initial "soft" carpet manufacturing stages—tufting of loops, cutting them to form a plush if desired, dyeing and drying, and then storing as unbacked "soft" roll goods until ready to apply a backcoating—are entirely similar to well-known methods as already described in patents, e.g.,: Stahl, U.S. Pat. No. 3,645,948. The disclosure of this patent is hereby incorporated by reference.

In preparing automotive carpet backed with a sound-deadening sheet, several routes may be used. All are technically feasible. The most logical routes would be (1) and (2) below, although route (3) would also be practical and might be preferred by one who did not want to invest in extrusion equipment.

Route (1)—Prepare an automotive-type "soft" carpet by tufting, dyeing, and drying following known methods. Then, using standard extrusion coating technology, apply first a relatively fluid precoating material such as a high melt index EVA or polyethylene resin or hot melt blend in an amount sufficient to bind the individual bundles as disclosed e.g., in Example III, of the above Stahl patent, and Smedberg U.S. Pat. No. 3,684,600. Then to the still warm and still soft precoated carpet, apply the desired amount of sound-deadening hot melt blend by means of a second extruder. Standard nip roll and chill roll means are used to secure good adhesion of the main coat to the precoat and to the carpet. The thickness of the combined layers of hot melt will be selected so as to achieve the desired sound-deadening level, in addition to moldability, shape retention ability, fuzz and pill resistance, etc. as is required by the ultimate customer.

Route (2)—In place of two extruders, it is possible to use a latex precoat, followed by a drying oven, which then will ultimately be followed by an extruder to apply the sound-deadening coating. Alternatively, the precoating method taught by Smedberg, U.S. Pat. No. 3,684,600, may be employed. In either case, the extrusion step can be carried out on an in-line basis, or, alternately, the sound-deadening coating can be extruded onto the carpet in a future operation.

Route (3)—The carpet can be made and precoated as per Route (1) or Route (2) above, and then stored. Sound-deadening sheet can be made elsewhere by extrusion or a calendering process in a totally independent operation. Then, the sheet can be laminated to the carpet by preheating the to-be-mated faces of the carpet and the sound-deadening sheet by appropriate means (ovens, IR heat), and the final structure assembled. Assembly would take place through applying pressure to the mating faces, as for example, by a set of nip rolls. This technology is similar to that taught by Ballard U.S. Pat. No. 3,940,525.

Effectively, all of the routes described above would apply with equal force to the preparation of carpet for flooring uses. The final product obtained would be different from standard floor-type carpet in that it would not require a sheet of secondary jute or synthetic scrim, for reasons given above and covered in the Ballard patent. It would be different from automotive carpet primarily because of face-side styling differences.

Thus, the initial processing steps would be tufting, dyeing, drying, as described above—followed by precoating, as described above—followed by application of the heavy coat (sound deadening coat) as described in Routes (1)–(3) above.

The following examples are given for the purpose of illustrating the present invention. All parts and percentages are by weight unless otherwise specified.

COMPARATIVE EXAMPLES 1–9

These examples show the increasing difficulty encountered in making highly filled binary blends using EVA resins as the sole binder. All ingredients were premixed in a one-gallon (about 3.8 L) can be shaking manually for about 0.5 minutes. The charge was then added to a Banbury-Type Laboratory-sized intensive high-shear mixer. Mix conditions used were fluxing for 3 minutes, at a temperature of about 325°–375° F. (about 160°–190° C.). Compositions and physical properties are summarized in Table IV. When a high molecular-weight, 18% vinyl acetate (VA) containing resin was used, increasing the filler ($CaCO_3$) level to 65% from 55% reduced elongation tenfold. A further filler increase to 72.5% resulted in a mixture which no longer would flux in a Banbury mixer. The "product" emerged as unblended, dry ingredients. In similar fashion, use of a lower molecular-weight, 18% VA containing resin or of a softer and also lower molecular-weight EVA resin blend did not enable fluxing in a Banbury mixer at 72.5% filler loading. Addition of filler caused one other pronounced effect—the stiffness of the blend increased.

TABLE IV
COMPOSITION AND PHYSICAL PROPERTIES OF EVA —$CaCO_3$ BLENDS

| Ingredients | Ex. C1 | Ex. C2 | Ex. C3 | Ex. C4 | Ex. C5 | Ex. C6 |
|---|---|---|---|---|---|---|
| EVA #1[1] | 45 | 35 | 27.5 | — | — | — |
| EVA #2[2] | — | — | — | 45 | 35 | 27.5 |
| EVA #3[3] | — | — | — | — | — | — |
| EVA #4[4] | — | — | — | — | — | — |
| #9 Whiting[5] | 55 | 65 | 72.5 | 55 | 65 | 72.5 |
| Physical Properties | | | | | | |
| SP. GR. of Blend | 1.47 | 1.59 | | 1.39 | 1.55 | |
| Tensile Strength, PSI[6] | 1050 | 904 | WILL | 662 | 706 | WILL |
| Tensile Strength, k Pa | 7240 | 6230 | NOT | 4560 | 4870 | NOT |
| Elongation, %[6] | 455 | 42 | | 34 | 23 | |
| Thickness of Strip, | | | FLUX | | | FLUX |
| Mils | 74 | 70 | | 68 | 68 | |
| MM | 1.88 | 1.78 | | 1.73 | 1.73 | |
| Stiffness of Strip, g[7] | 160 | 157 | | 99 | 121 | |

| Ingredients | Ex. C7 | Ex. C8 | Ex. C9 |
|---|---|---|---|
| EVA #1[1] | — | — | — |
| EVA #2[2] | — | — | — |
| EVA #3[3] | 22.5 | 17.5 | 13.75 |
| EVA #4[4] | 22.5 | 17.5 | 13.75 |
| #9 Whiting[5] | 55 | 65 | 72.5 |
| Physical Properties | | | |
| SP. GR. of Blend[8] | 1.50 | 1.60 | |
| Tensile Strength PSI[6] | 669 | 627 | WILL |
| Tensile Strength, k Pa | 4610 | 4320 | NOT |
| Elongation, %[6] | 426 | 401 | |
| Thickness of Strip, | | | FLUX |
| Mils | 68 | 68 | |
| MM | 1.73 | 1.73 | |

TABLE IV-continued
COMPOSITION AND PHYSICAL PROPERTIES OF EVA —$CaCO_3$ BLENDS

| Stiffness of Strip, g[7] | 94 | 114 |
|---|---|---| footnotes:
[1] 18% vinyl acetate, 82% ethylene copolymer; M.I. = 2.5
[2] 18% vinyl acetate, 82% ethylene copolymer; M.I. = 150
[3] 25% vinyl acetate, 75% ethylene copolymer; M.I. = 2.0
[4] 25% vinyl acetate, 75% ethylene copolymer; M.I. = 19.1
[5] Calcium carbonate, as commercial ground limestone; Georgia Marble Co.
[6] Tensile strength and elongation measurements made on Instron Tester using ASTM Method D1708 at crosshead speed of 2 in (5.1 cm)/min. Samples are 0.876 in. (2.23 cm) × 0.187 in. (0.47 cm) in size, at strip thickness shown in table.
[7] Stiffness of strip measured by placing a 1 in × 6 in (2.54 cm × 15.2 cm) strip on a platform scale, and measuring the force required to make the ends of the test strip meet, at room temperature.
[8] referred to water.

EXAMPLES 1–7 AND COMPARATIVE EXAMPLES 10–13

The blends of these Examples were prepared and their physical properties were determined in the same manner as those of Comparative Examples 1–9. Compositions and physical properties are summarized in Table V. C-10 has a relatively low weight ratio—1.8—of filler to organic binder. When the ratio is raised to 2.6/1, as in C-11, the blend will not flux, as noted earlier. However, as shown in Example 1, at the identical filler loading, after having replaced part of the expensive resin with an inexpensive processing oil, a truly surprising result was obtained—the mixture fluxed well in the Banbury mixer. Even more surprisingly the blend of Example 2, which represents a further increase in filler/resin ratio, (4.1/1) not only fluxed well, but had properties of definite practical interest. For example, for comparison of properties of two sound-deadening sheets, it is important to compare them on an equal weight basis. That is, the two sheet density values, in $lb/ft^2$, ($oz/yd^2$ or $g/m^2$) should be equal or as close as is reasonably possible. Thus, sheeting for Example 2 was deliberately made thinner than that for C-10, to attain equal sheet density (70 mils × 1.59/1.81 = 61 mils vs the experimentally-measured 58 mils, or within 0.003 in. of goal thickness). Note that the stiffness of Example 2 sheeting is only about ⅓ of the stiffness of sheet from blend C-10, and still has tensile and elongation properties which remain in a commercially useable range.

A second comparison was made to learn whether this surprising finding was limited to high molecular-weight polymers such as that used in Examples 1 and 2. Examples 3 and 4, when compared to blends C-12 and C-13, show the same effects even though the EVA grades used are equivalent to a much softer copolymer (higher VA content) which also has a lower molecular weight.

Examples 5, 6, and 7 show blends with various combinations of filler, resin and oil and different ratios of filler to resin. The resulting property changes illustrate the latitude available to the formulator in seeking a desired balance of properties.

TABLE V
COMPOSITION AND PHYSICAL PROPERTIES OF EVA —$CaCO_3$— PROCESSING OIL BLENDS

| Ingredients | Ex. C10 | Ex. C11 | Ex. 1 | Ex. 2 | Ex. C12 | Ex. C13 |
|---|---|---|---|---|---|---|
| EVA #1 | 35 | 27.5 | 20.5 | 17.5 | — | — |
| EVA #3 | — | — | — | — | 17.5 | 13.75 |
| EVA #4 | — | — | — | — | 17.5 | 13.75 |
| #9 Whiting | 65 | 72.5 | 72.5 | 72.5 | 65 | 72.5 |
| "CIRCOSOL" | | | | | | |

TABLE V-continued
COMPOSITION AND PHYSICAL PROPERTIES OF EVA —CaCO$_3$— PROCESSING OIL BLENDS

| 4240[1] | — | — | 7 | 10 | — | — |
|---|---|---|---|---|---|---|
| Filler/Organic Ratio | 1.8/1 | 2.6/1 | 2.6/1 | 2.6/1 | 1.8/1 | 2.6/1 |
| Filler/Resin Ratio | 1.8/1 | 2.6/1 | 3.5/1 | 4.1/1 | 1.8/1 | 2.6/1 |
| Physical Properties | | | | | | |
| SP. GR. of Blend | 1.59 | | 1.82 | 1.81 | 1.60 | |
| Tensile Strength, PSI | 904 | WILL | 649 | 636 | 627 | WILL |
| Tensile Strength, k Pa | 6230 | NOT | 4470 | 4390 | 4320 | NOT |
| Elongation, % | 42 | | 21 | 23 | 401 | |
| Thickness of Strip, | | FLUX | | | | FLUX |
| Mils | 70 | | 59 | 58 | 68 | |
| MM | 1.78 | | 1.50 | 1.47 | 1.72 | |
| Stiffness of Strip, g | 157 | | 89 | 57 | 114 | |

| Ingredients | Ex. 3 | Ex. 4 | Ex. 5 | Ex. 6 | Ex. 7 |
|---|---|---|---|---|---|
| EVA #1 | — | — | — | — | — |
| EVA #3 | 9.75 | 8.75 | 9.0 | 11.25 | 10.5 |
| EVA #4 | 9.75 | 8.75 | 9.0 | 11.25 | 10.5 |
| #9 Whiting | 72.5 | 72.5 | 75.0 | 70.0 | 70.0 |
| "CIRCOSOL" 4240[1] | 8 | 10 | 7.0 | 7.5 | 8.0 |
| Filler/Organic Ratio | 2.6/1 | 2.6/1 | 3/1 | 2.33/1 | 2.33/1 |
| Filler/Resin Ratio | 3.7/1 | 4.1/1 | 4.2/1 | 3.1/1 | 3.33/1 |
| Physical Properties | | | | | |
| SP. GR. of Blend | 1.81 | 1.82 | 1.87 | 1.76 | 1.76 |
| Tensile Strength, PSI | 475 | 410 | 585 | 557 | 488 |
| Tensile Strength, k Pa | 3280 | 2830 | 4030 | 3840 | 3360 |
| Elongation, % | 27 | 33 | 19 | 37 | 38 |
| Thickness of Strip, | | | | | |
| Mils | 59 | 59 | 59 | 62 | 62 |
| MM | 1.50 | 1.50 | 1.50 | 1.57 | 1.57 |
| Stiffness of Strip, g | 53 | 45 | 73 | 65 | 62 |

[1]A naphthenic processing oil available from Sun Petroleum Products Company. The composition for the oil as given by the supplier is 39% naphthenic carbon, 40% paraffinic carbon, and 21% aromatic carbon. Viscosity at 100° F. is 2525 SUS. Specific gravity is 0.9490.

EXAMPLES 8-11

Whiting (CaCO$_3$) is a very common and cheap filler with a density of about 2.7 g/cm$^3$. One might elect to employ a very dense, but more costly, filler to achieve a special purpose. Table VI illustrates some ways the new technology can be employed with a dense filler. Blend preparation and determination of physical properties followed the procedure outlined in preceding examples. Example 8 shows a blend which contains 75% whiting by weight—or about 51% by volume. Examples 9 and 10 show the results when barytes is used instead, on a simple substitution basis, by weight. Example 11 shows properties attainable, when barytes is substituted for whiting, by volume.

These changes are very significant in specialized uses, e.g., sound-deadening sheeting or backing. For example, the compounder has several choices:

(a) For maximum weight at equal coating thickness, Example 11 would clearly prove superior.

(b) For equal weight at minimum coating thickness, Example 11 would again prove superior.

(c) Conversely, where maximum coating thickness is desired, at a given weight per unit area, Example 8 would prove best.

The data summarized in Table VI were deliberately generated in a way to produce nearly equal weights per unit area. If instead the test plaques had been made at equal thickness, the values noted for relative stiffness would change markedly. This represents another option available to one skilled in the art to practice the present invention, whereby a radical shift in goal properties can be secured. In using the above data, it is important to realize that small shifts in thickness or in methods of sample preparation can cause variations in measured values without departure from the essence of the invention.

TABLE VI
COMPOSITION AND PHYSICAL PROPERTIES OF EVA —CaCO$_3$ or BaSO$_4$— OIL BLENDS

| Ingredients | Ex. 8 | Ex. 9 | Ex. 10 | Ex. 11 |
|---|---|---|---|---|
| EVA #3 | 10 | 10 | 8.75 | 6.1 |
| EVA #4 | 10 | 10 | 8.75 | 6.1 |
| #9 Whiting | 75 | — | — | — |
| Barytes[1] | — | 75 | 75 | 82.5 |
| "CIRCOSOL" 4240 | 5 | 5 | 7.5 | 5.3 |
| Filler, % by Volume | 51.3 | 39.5 | 39.5 | 50.7 |
| Physical Properties | | | | |
| SP. GR. of Blend | 1.87 | 2.32 | 2.28 | 2.67 |
| Tensile Strength, PSI | 685 | 555 | 345 | 229 |
| Tensile Strength, k Pa | 4720 | 3830 | 2380 | 1580 |
| Elongation, % | 18 | 700 | 561 | 68 |
| Thickness of Strip, | | | | |
| Mils | 58 | 47 | 48 | 40 |
| MM | 1.47 | 1.19 | 1.22 | 1.02 |
| Stiffness of Strip, g | 84 | 34 | 25 | 24 |

[1]A heavy filler having a density, of about 4.4 g/cm$^3$ consisting primarily of BaSO$_4$, obtained from commercial sources. For Example 9, #22 Barytes from Thompson, Weinman was used. For Examples 10 and 11, Dresser Industries #85 Barytes was used. For all practical purposes, the materials are considered to be interchangeable.

EXAMPLES 12-13 AND COMPARATIVE EXAMPLE 14

Following the procedure of preceding examples blends were made with E/EA copolymer in place of the EVA copolymer. The results obtained (Table VII) were similar to the ones obtained with EVA copolymer.

The addition of "Circosol" 4240 to a binary blend enables use of a much-increased filler loading, while maintaining a practical degree of tensile strength and elongation characteristics and while appreciably reducing the stiffness of the final compound.

TABLE VII
COMPOSITION AND PHYSICAL PROPERTIES OF E/EA —CaCO$_3$— OIL BLENDS

| Ingredients | Ex. C-14 | Ex. 12 | Ex. 13 |
|---|---|---|---|
| E/EA[1] | 45 | 20.2 | 17 |
| #9 Whiting | 55 | 72.5 | 75 |
| "CIRCOSOL" 4240 | — | 7.3 | 8 |
| Physical Properties | | | |
| SP. GR. of Blend | 1.46 | 1.76 | 1.83 |
| Tensile Strength, PSI | 715 | 554 | 500 |

TABLE VII-continued
COMPOSITION AND PHYSICAL PROPERTIES OF E/EA —CaCO3— OIL BLENDS

| | | | |
|---|---|---|---|
| Tensile Strength, k Pa | 4930 | 3820 | 3450 |
| Elongation, % | 73 | 15 | 15 |
| Thickness of Strip, | | | |
| Mils | 75 | 61 | 59 |
| MM | 1.90 | 1.55 | 1.50 |
| Stiffness of Strip, g | 181 | 94 | 95 |

[1]Ethylene/ethyl acrylate copolymer, grade DPDA 6182 NT, obtained from Union Carbide Corporation, contains about 16% ethyl acrylate, about 84% ethylene, and has a melt index of about 1.5.

EXAMPLES 14-19

These examples illustrate the use of different interpolymers in practicing the present invention. Preparation and evaluation of the blends followed the procedure of preceding examples.

Compositions and physical properties are summarized in Table VIII.

The blends of these examples are free of surface tack and exuded oil at ambient temperature. One skilled in the art can readily make a wide assortment of changes, such as:

(a) Using blends of interpolymers.

(b) Using alternate fillers.

(c) Using other oil ingredients, such as aromatic or paraffinic oils, in place of all or part of the naphthenic oil used in Table VIII examples. It is, of course, possible to use oils of higher or lower viscosity to secure special effects.

(d) Adding other ingredients, such as waxes, rubbers, elastomers, tackifiers, plasticizers, extenders, resins, etc. such as are widely used in compounding of hot melts and extrudable compositions.

TABLE VIII
COMPOSITION AND PHYSICAL PROPERTIES OF BLENDS OF ETHYLENE-INTERPOLYMERS, CaCO3 AND OIL

| Ingredients | Ex. 14 | Ex. 15 | Ex. 16 | Ex. 17 | Ex. 18 | Ex. 19 |
|---|---|---|---|---|---|---|
| E/IBA #1[1] | 20.2 | — | — | — | — | — |
| E/IBA #2[2] | — | 20.2 | — | — | — | — |
| E/MMA #1[3] | — | — | 20.2 | — | — | — |
| E/MMA #2[4] | — | — | — | 20.2 | — | — |
| EVA #3 | — | — | — | — | 10.1 | — |
| Terpolymer #1[5] | — | — | — | — | 10.1 | — |
| Terpolymer #2[6] | — | — | — | — | — | 21 |
| #9 Whiting | 72.5 | 72.5 | 72.5 | 72.5 | 72.5 | 70.0 |
| "CIRCOSOL" 4240 | 7.3 | 7.3 | 7.3 | 7.3 | 7.3 | 9.0 |
| SP. GR. of Blend | 1.84 | 1.81 | 1.81 | 1.84 | 1.85 | 1.74 |
| Tensile Strength, PSI | 227 | 536 | 579 | 349 | 381 | 546 |
| Tensile Strength, k Pa | 1570 | 3700 | 3990 | 2410 | 2630 | 3760 |
| Elongation, % | 50 | 23 | 22 | 46 | 34 | 63 |
| Thickness of Strip, | | | | | | |
| Mils | 58 | 59 | 59 | 58 | 58 | 62 |
| MM | 1.47 | 1.50 | 1.50 | 1.47 | 1.47 | 1.57 |
| Stiffness of Strip, g | 24 | 73 | 71 | 37 | 52 | 56 |

[1]ethylene/isobutyl acrylate copolymer, 32% isobutyl acrylate, 68% ethylene, 1.7 MI.
[2]ethylene/isobutyl acrylate copolymer, 20% isobutyl acrylate 80% ethylene, 2.5 MI.
[3]ethylene/methyl methacrylate copolymer, 18% methyl methacrylate, 82% ethylene, 2.2 MI.
[4]ethylene/methyl methacrylate copolymer, 31% methyl methacrylate, 69% ethylene, 7.2 MI.
[5]ethylene/carbon monoxide/vinyl acetate terpolymer, 65.5% ethylene, 11% CO, 23.5% vinyl acetate, 35 MI.
[6]ethylene/vinyl acetate/methacrylic acid terpolymer, 74% ethylene, 25% vinyl acetate, 1% methacrylic acid, 6 MI.

EXAMPLES 20-23

These examples illustrate how the melt index of the blends of the present invention can be controlled over wide ranges by the amount of oil employed. Compositions and results are summarized in Table IX. Melt index is of substantial practical importance to those who extrude compounds into sheet form or mold it into appropriate shapes. By proper control of melt index, optimum extrudate properties can be secured, or properties can be matched to the capability of available equipment.

TABLE IX
EFFECT OF INCREASING OIL CONTENT ON THE MELT INDEX OF THE BLEND

| Ingredients | Ex. 20 | Ex. 21 | Ex. 22 | Ex. 23 |
|---|---|---|---|---|
| Base Compound[1] | 100 | 98 | 96 | 94 |
| "CIRCOSOL" 4240 | — | 2 | 4 | 6 |
| Melt Index Of Blend[2] | 1.79 | 3.39 | 4.90 | 9.65 |

[1]Consists of (a) 20% of EVA copolymer having 25% VA, 75% ethylene, & 2MI; (b) 4% of EVA copolymer having 7.5% VA, 92.5% ethylene, % 1.2MI; (c) 6% of "CIRCOSOL" 4240 and (d) 70% of #9 Whiting.
[2]Determined by ASTM Method D 1238, at 190° C.

EXAMPLE 24 AND COMPARATIVE EXAMPLE C-15

The blends of this Example were compounded in a laboratory-scale Banbury mixer for convenience, as previously described, and were then processed into sheet form in a conventional two-roll mill. To make test plaques or sheets, the desired amount of blend would be weighed, placed in a laboratory-scale heated press, and pressed (between smooth release sheets of Teflon ® fluorocarbon resin) in a die of appropriate thickness. For convenience, the present die had an opening of 6"×6", was cut from sheet stock of 58 or 65 mils of thickness, depending on blend density, and was charged in most instances with 63 grams of resin blend. This corresponds to 5 lbs./yd.$^2$, a commonly used sheet weight for automotive carpet use. A typical cycle was:

(1) Place a Teflon ® sheet on lower press platen or on top of a smooth steel baseplate if the platen is not truly smooth.

(2) Place an 8"×10" die plate (6"×6" opening) atop the Teflon ® sheet.

(3) Put 63 g. of resin in the cavity. (1–2 grams surplus may be needed as some blend may ooze out during pressing).

(4) Place a Teflon ® fluorocarbon sheet atop the resin. Add a smooth steel upper plate if the platen is not truly smooth.

(5) Heat the press to 175° C.

(6) When the press reaches 175° C., slowly pump the press closed to a total pressure of about 12,500 pounds (150 psi, approximately).

(7) After 2 minutes, raise the ram pressure to 50,000 pounds (600 psi, approximately), and hold the pressure and temperature constant for about 1 minute.

(8) Shut off heat and cool press to ambient temperature with ram in closed position.

(9) Release pressure, remove sample, and cut to appropriate shape for further testing.

(10) Age samples overnight at 50% RH and 72° F.

In evaluating highly filled blends, great care and good technique must be used in making all samples, as surface imperfections will cause wide variations in measurements of tensile strength and elongation.

The composition of this Example, is viewed as preferred and as a logical starting point for a compounder because it offers an excellent balance of properties (cf. Table X). For example, the tensile strength value at 550 psi (3790 kPa) is high enough for anticipated uses for filled thermoplastic blends. Further, the elongation noted, at 455%, is outstanding for a highly filled blend. Despite these excellent properties, the stiffness value for the compound is only 76 g. vs. the high 118 g. for the oil-free comparative blend, C-15. As this balance of properties indicates, the blend of Example 24 can be readily prepared from its ingredients and also can be readily extruded into sheet form. On the other hand, Blend C-15, compared to Blends C-12 and C-13 (Table V), has about reached the ultimate upper limit for filler load on an oil-free basis. The compound tensile strength has jumped sharply, and elongation has dropped sharply vs. Blend C-12. Physical property data for Blend C-15 were not easily determined, as it was very difficult to make good, reproducible test coupons using so high a filler loading without inclusion of oil.

The above preferred blend does have a drawback; it is possible to produce more highly filled compositions, with an equal or higher oil content, and thus save substantially in raw material costs at the expense of physical properties. For example, compare the physical properties of the blend of Example 24 with the properties of blends of Examples 3 through 7 in Table V. The latter blends, while still useful for many purposes, have about ⅓ less tensile strength and about 1/10 the elongation—surely a major reduction. However, because EVA copolymers cost over 50¢/pound vs. less than 10¢/pound for oil and about a penny per pound for filler, it is readily apparent that many users will want to pursue the highest possible filler level aggressively. This is particularly true for automotive and other sound-deadening sheet, which depends upon mass for its effectiveness and often does not require great blend strength. Thus, it is likely that many industrial users will take the above "preferred blend" and reduce its excellent technical properties to a lesser level which will still be technically adequate for their uses and will be much more attractive from a competitive economic viewpoint. A skilled compounder will realize the trade-offs and options open to him in reducing performance to reduce price and can vary substantially the blends provided in the illustrative examples without departing from the spirit of the invention. Compounders can also elect to vary blend properties by substituting other grades of EVA copolymer for all or part of the EVA #3 content. For example, use of an EVA copolymer having a lower VA content or a lower MI or both, as shown in the blends of Examples 20-23, (Table IX), will provide a stiffer blend with improved resistance to deformation at temperatures above ambient. Similar changes can of course be effected by adding small amounts of unrelated resins, rubbers, elastomers, extenders, etc. without departing from the spirit of the invention.

TABLE X

| PREFERRED SOUND-DEADENING COMPOSITION | | |
|---|---|---|
| Ingredients | Example 24 | Example C-15 |
| EVA #3, % | 26.5 | 33 |
| "Circosol" 4240, % | 6.5 | — |
| #9 Whiting, % | 67.0 | 67 |
| Physical Properties: | | |
| Sp. Gr. of Blend | 1.72 | 1.72 |
| Tensile Strength - psi | 550 | 895 |
| - kPa | 3790 | 6170 |
| Elongation, % | 455 | 99 |
| Thickness of Strip, mils | 65 | 65 |
| Thickness of Strip, mm | 1.65 | 1.65 |
| Stiffness of Strip, g | 76 | 118 |

EXAMPLES 25-26 AND COMPARATIVE EXAMPLE 16

These examples show that even readily fluxable EVA/filler blends having a relatively low filler content can be usefully altered by addition of small amounts of a processing oil. Compositions and results are summarized in Table XI. Blend C-16, for example, is a very stiff compound with good elongation and with a high tensile strength. To make the blends of Example 25 and Example 26, the resin content was reduced by 5% and 10%, respectively, and replaced by processing oil. The elongation values and the density were virtually unchanged. However, the blend became surprisingly softer, yet retained a good tensile strength value. Thus, addition of oil to a filled EVA system conferred benefits.

TABLE XI

| COMPOSITION AND PHYSICAL PROPERTIES EVA —CaCO$_3$— OIL BLENDS AT 55% FILLER LOAD | | | |
|---|---|---|---|
| Ingredients | Ex. C-16 | Ex. 25 | Ex. 26 |
| EVA #1 | 45 | 40 | 35 |
| #9 Whiting | 55 | 55 | 55 |
| "CIRCOSOL" 4240 | — | 5 | 10 |
| Physical Properties | | | |
| SP. GR. of Blend | 1.46 | 1.48 | 1.47 |
| Tensile Strength, PSI | 935 | 618 | 491 |
| Tensile Strength, kPa | 6450 | 4260 | 3380 |
| Elongation, % | 396 | 348 | 384 |
| Thickness of Strip, | | | |
| Mils | 74 | 74 | 74 |
| mm | 1.88 | 1.88 | 1.88 |
| Stiffness of Strip, g | 153 | 99 | 72 |

EXAMPLES 27-35

The composition and physical properties of the blends of these examples are summarized on Table XII. The blends were made with a fixed proportion of EVA resins plus fillers following the procedure of preceding examples. While the percentage of oil present has been held constant, the type and viscosities have been varied.

Of the 9 oils tested in this series the aromatic oils showed no tendency to exude, while the paraffinic oils exuded. Of the naphthenic blends, only the Example 28 sample showed an exudation tendency. This sample contained "Flexon" 766, which has 54% paraffinic content, 45% naphthenic, and 1% aromatic. By contrast, the other three naphthenic oils had a paraffinic oil content of 42% or less. Thus, the need to carefully examine the type of oil selected is evident to ensure attaining the desired surface characteristics (i.e., dry or oily) for the final product.

All of the blends had about the same specific gravity, and thus the same thickness strips were compared. Results show the highest stiffness resulted when the highest molecular-weight oil was used. Further, scouting tests (not tabulated) showed that the blends made with low molecular-weight (low viscosity) oils had better resistance to flexing at temperatures below zero degrees Fahrenheit.

carbon atoms, unsaturated mono- or dicarboxylic acids of 3 to 5 carbon atoms, and esters of said unsaturated mono- or dicarboxylic acids wherein the alcohol moiety has 1 to 8 carbon atoms, the ethylene content of said copolymer being from about 60 to about 90% by weight, the comonomer content of said copolymer being from about 10 to about 40% by weight, and the melt index of said copolymer being from about 0.1 to about 150, provided that when said copolymer of ethylene is an ethylene/vinyl ester copolymer said copolymer can contain up to about 15% by weight of carbon monoxide or sulfur dioxide; (b) from about 2 to about 15% by weight of processing oil; and (c) from about 50 to about 90% by weight of filler.

2. The composition of claim 1 wherein said copolymer of ethylene is present in an amount of from about 5 to about 30% by weight, said processing oil is present in an amount of from about 4 to about 12% by weight and said filler is present in an amount of from about 60 to about 85% by weight.

TABLE XII
COMPOSITION AND PHYSICAL PROPERTIES OF EVA —CaCO₃— OIL BLENDS CONTAINING DIFFERENT TYPES OF OIL

| Ingredients: | EVA #3 & #4 | | = 8% of each | | |
| --- | --- | --- | --- | --- | --- |
| | OIL | | = 9% | | |
| | FILLER (CaCO₃) | | = 75% | | |

| | Ex. 27 | Ex. 28 | Ex. 29 | Ex. 30 | Ex. 31 |
| --- | --- | --- | --- | --- | --- |
| Type of Oil[1] | C450 (N) | F766 (N) | C4240(N) | C5600 (N) | F340 (A) |
| Physical Properties: | | | | | |
| SP.GR. of Blend | 1.87 | 1.86 | 1.88 | 1.87 | 1.87 |
| Tensile Strength, PSI | 431 | 422 | 397 | 477 | 385 |
| kPa | 2972 | 2910 | 2737 | 3289 | 2654 |
| Elongation, % | 15 | 22 | 19 | 21 | 21 |
| Thickness of Strip, Mils | 58 | 59 | 59 | 58 | 58 |
| mm | 1.47 | 1.50 | 1.50 | 1.47 | 1.47 |
| Stiffness of Strip, g | 47 | 45 | 40 | 55 | 46 |
| Exudation Rating | NONE | HEAVY | NONE | NONE | NONE |

| Ingredients: | EVA #3 & #4 | | = 8% of each | |
| --- | --- | --- | --- | --- |
| | OIL | | = 9% | |
| | FILLER (CaCO₃) | | = 75% | |

| | Ex. 32 | Ex. 33 | Ex. 34 | Ex. 35 |
| --- | --- | --- | --- | --- |
| Type of Oil[1] | 5790(A) | S8600T(A) | T60(P) | T80(P) |
| Physical Properties: | | | | |
| SP.GR. of Blend | 1.88 | 1.88 | 1.87 | 1.85 |
| Tensile Strength, PSI | 560 | 505 | 463 | 401 |
| kPa | 3861 | 3482 | 3192 | 2765 |
| Elongation, % | 18 | 22 | 24 | 18 |
| Thickness of Strip, Mils | 58 | 58 | 58 | 58 |
| mm | 1.47 | 1.47 | 1.47 | 1.47 |
| Stiffness of Strip, g | 63 | 60 | 47 | 50 |
| Exudation Rating | NONE | NONE | HEAVY | HEAVY |

[1]Key is:
C = "CIRCOSOL"
F = "FLEXON"
S = "SUNDEX"
T = "TUFFLO"
(N) = NAPHTHENIC
(A) = AROMATIC
(P) = PARAFFINIC

We claim:

1. A composition consisting essentially of (a) from about 5 to about 50% by weight of at least one copolymer of ethylene with at least one comonomer selected from the group consisting of vinyl esters of saturated carboxylic acids wherein the acid moiety has up to 4

3. The composition of claim 2 wherein said processing oil is selected from the group consisting of naphthenic and aromatic oils.

4. The composition of claim 3 wherein said filler is selected from the group consisting of calcium carbonate and barium sulfate.

5. The composition of claim 4 wherein said copolymer of ethylene is selected from the group consisting of ethylene/vinyl acetate, ethylene/acrylic acid, ethylene/methacrylic acid, ethylene/ethylacrylate, ethylene/isobutyl acrylate, ethylene/methyl methacrylate, ethylene/vinyl acetate/methacrylic acid and ethylene/vinyl acetate/carbon monoxide.

6. The composition of claim 5 wherein the ethylene content of said copolymer is from about 65 to about 85% by weight, the comonomer content of said copolymer is from about 15 to about 35% by weight and the melt index of said copolymer is from about 0.1 to about 50.

7. The composition of claim 6 wherein said copolymer of ethylene is selected from the group consisting of ethylene/vinyl acetate, ethylene/ethyl acrylate and ethylene/vinyl acetate/carbon monoxide.

8. The composition of claim 7 wherein said processing oil has a viscosity of from about 100 to about 6000 SUS at 100° F.

9. The composition of claim 8 wherein said copolymer of ethylene is ethylene/vinyl acetate.

10. The composition of claim 9 wherein said ethylene/vinyl acetate is present in an amount of from about 10 to about 25% by weight, said processing oil is present in an amount of from about 4 to about 10% by weight, and said filler is present in an amount of from about 65 to about 85% by weight.

11. The composition of claim 3 wherein said filler has a density of from about 1.5 to about 3 g/cm$^3$.

12. The composition of claim 11 wherein said filler is calcium carbonate.

13. The composition of claim 12 wherein said copolymer of ethylene is ethylene/vinyl acetate which is present in an amount of from about 10 to about 25% by weight, said processing oil is present in an amount of from about 5 to about 10% by weight, and said calcium carbonate is present in an amount of from about 65 to about 80% by weight.

14. The composition of claim 3 wherein said filler has a density of above 3 g/cm$^3$.

15. The composition of claim 14 wherein said filler is barium sulfate.

16. The composition of claim 15 wherein said copolymer of ethylene is ethylene/vinyl acetate which is present in an amount of from about 10 to about 20% by weight, said processing oil is present in an amount of from about 4 to about 10% by weight and said barium sulfate is present in an amount of from about 70 to about 85% by weight.

17. The composition of claims 2, 7, 10, 13 or 16 wherein the ethylene content of said copolymer is from about 72 to about 82% by weight, the comonomer content of said copolymer is from about 18 to about 28% by weight and the melt index of said copolymer is from about 1 to about 10.

18. The composition of claims 2, 7, 10, 13 or 16 in the form of a sound-deadening sheet.

19. A carpet having a backside coating consisting essentially of the composition of claims 2, 7, 10, 13 or 16.

20. An automotive carpet having a backside coating consisting essentially of the composition of claims 2, 7, 10, 13 or 16.

* * * * *